(12) United States Patent
Bohnstingl et al.

(10) Patent No.: US 11,803,737 B2
(45) Date of Patent: Oct. 31, 2023

(54) MEMORY-AUGMENTED SPIKING NEURAL NETWORK SYSTEM

(71) Applicant: International Business Machines Corporation, Armonk, NY (US)

(72) Inventors: Thomas Bohnstingl, Thalwil (CH); Angeliki Pantazi, Thalwil (CH); Stanislaw Andrzej Wozniak, Kilchberg (CH); Evangelos Stavros Eleftheriou, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 645 days.

(21) Appl. No.: 16/919,139

(22) Filed: Jul. 2, 2020

(65) Prior Publication Data
US 2022/0004851 A1 Jan. 6, 2022

(51) Int. Cl.
| | | |
|---|---|---|
| *G06N 3/06* | (2006.01) | |
| *G06N 3/08* | (2023.01) | |
| *G06N 3/063* | (2023.01) | |
| *G06N 3/049* | (2023.01) | |
| *G06N 3/048* | (2023.01) | |
| *G06N 3/084* | (2023.01) | |
| *G06N 3/065* | (2023.01) | |

(52) U.S. Cl.
CPC ............ *G06N 3/063* (2013.01); *G06N 3/048* (2023.01); *G06N 3/049* (2013.01); *G06N 3/065* (2023.01); *G06N 3/084* (2013.01)

(58) Field of Classification Search
CPC ........... G06N 3/065; G06N 3/08; G06N 3/084
See application file for complete search history.

(56) References Cited

U.S. PATENT DOCUMENTS

| | | | |
|---|---|---|---|
| 2019/0042920 A1 | 2/2019 | Akin et al. | |
| 2019/0065955 A1* | 2/2019 | Ozcan | .................... G06N 3/082 |
| 2019/0122110 A1* | 4/2019 | Ruckauer | ............... G06N 3/105 |
| 2019/0156209 A1 | 5/2019 | Arthur et al. | |

OTHER PUBLICATIONS

Kim, Yongtae, Yong Zhang, and Peng Li. "A digital neuromorphic VLSI architecture with memristor crossbar synaptic array for machine learning." 2012 IEEE International SOC Conference. IEEE, 2012. (Year: 2012).*

(Continued)

*Primary Examiner* — Hal Schnee
(74) *Attorney, Agent, or Firm* — Donald J. O'Brien

(57) ABSTRACT

The present disclosure relates to a neural network system comprising: a controller including a processing unit configured to execute a spiking neural network, and an interface connecting the controller to an external memory. The controller is configured for executing the spiking neural network, the executing comprising generating read instructions and/or write instructions. The interface is configured for: generating read weighting vectors according to the read instructions, coupling read signals, representing the read weighting vectors, into input lines of the memory, thereby retrieving data from the memory, generating write weighting vectors according to the write instructions, coupling write signals, representing the write weighting vectors, into output lines of the memory, thereby writing data into the memory.

17 Claims, 10 Drawing Sheets

(56) References Cited

OTHER PUBLICATIONS

Srinivasan, Gopalakrishnan, et al. "Training deep spiking neural networks for energy-efficient neuromorphic computing." ICASSP 2020-2020 IEEE International Conference on Acoustics, Speech and Signal Processing (ICASSP). IEEE, 2020. (Year: 2020).*
Lee, Chankyu, et al. "Enabling spike-based backpropagation for training deep neural network architectures." Frontiers in neuroscience (2020): 119. (Year: 2020).*
Santoro et al., "Meta-Learning with Memory-Augmented Neural Networks", Proceedings of the 33rd International Conference on Machine Learning, 2016, 9 pages.
Graves et al., "Hybrid computing using a neural network with dynamic external memory", Nature, vol. 538, Oct. 27, 2016, pp. 471-491.
Csordas et al., "Improving Differentiable Neural Computers Through Memory Masking, De-Allocation, and Link Distribution Sharpness Control", Published as a conference paper at ICLR 2019, pp. 1-13.
Graves et al., "Neural Turing Machines", Dec. 10, 2014, pp. 1-26.
Ranjan et al., "X-Mann: A Crossbar based Architecture for Memory Augmented Neural Networks", DAC '19, Jun. 2-6, 2019, 6 pages.
Strubell et al., "Energy and Policy Considerations for Deep Learning in NLP", Jun. 5, 2019, 6 pages.
Wozniak et al., "Deep Networks Incorporating Spiking Neural Dynamics", Dec. 17, 2018, 9 pages.
Wozniak et al., "Learning Spatio-Temporal Patterns in the Presence of Input Noise using Phase-Change Memristors", 2016 IEEE International Symposium on Circuits and Systems (ISCAS), May 22-25, 2016, pp. 365-368.
Pantazi et al., "All-memristive neuromorphic computing with level-tuned neurons", Nanotechnology, Published Jul. 26, 2016, 14 pages.
Lee et al., "Flexon: A Flexible Digital Neuron for Efficient Spiking Neural Network Simulations", 2018 ACM/IEEE 45th Annual International Symposium on Computer Architecture, pp. 275-288.
Martinolli, M., "Memory-Augmented Neural Networks: Enhancing Biological Plausibility and Task-Learnability", Academic Year 2016-2017, 123 pages.
Bellec et al., "Long Short-Term Memory and Learning-To-Learn in Networks of Spiking Neurons" Dec. 25, 2018, 19 pages.

* cited by examiner

MEMORY-AUGMENTED SPIKING NEURAL NETWORK SYSTEM

BACKGROUND

The disclosure relates in general to the field of neural network systems and, in particular, to a memory-augmented spiking neural network system.

Neural networks are a computational model used in artificial intelligence systems. Neural networks are based on multiple artificial neurons. Each artificial neuron is connected with one or more other neurons, and links can enhance or inhibit the activation state of adjoining neurons.

SUMMARY

The present disclosure relates to a neural network system comprising: a controller including a processing unit configured to execute a spiking neural network, and an interface connecting the controller to an external memory. The controller is configured for executing the spiking neural network, the executing comprising generating read instructions and/or write instructions. The interface is configured for: generating read weighting vectors according to the read instructions, coupling read signals, representing the read weighting vectors, into input lines of the memory, thereby retrieving data from the memory, generating write weighting vectors according to the write instructions, coupling write signals, representing the write weighting vectors, into output lines of the memory, thereby writing data into the memory.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
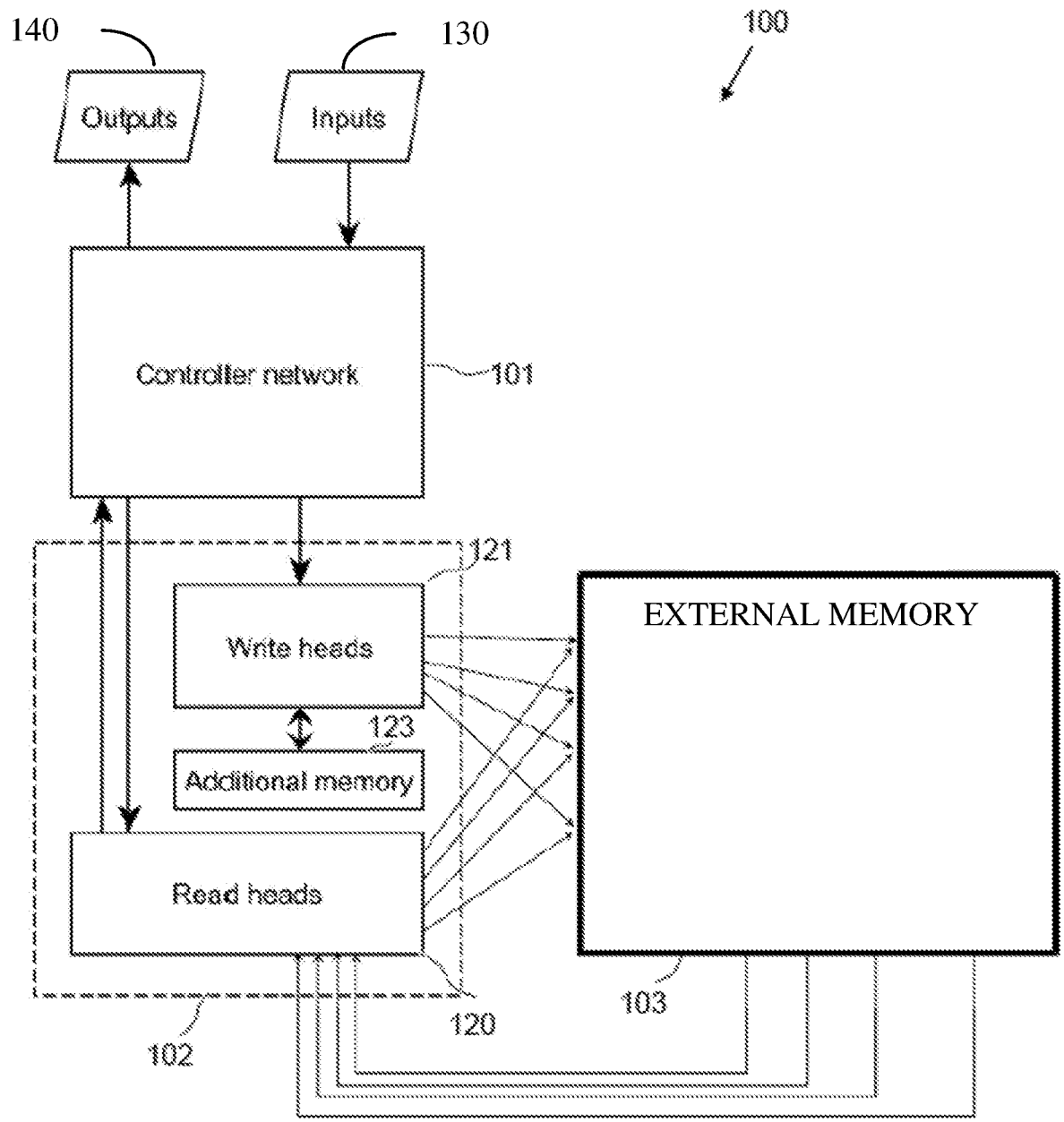
FIG. 1 is a block diagram of a memory-augmented neural network system, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter provides a memory-augmented spiking neural network system. The memory-augmented spiking neural network system may enhance a spiking neural network with an external memory. This may combine advantages from neural network data processing and persistent storage.

Using the spiking neural network may be advantageous as it may reduce the communication in the memory-augmented system. For example, only spikes may be transmitted between the access heads and the controller network. Only spikes may be transmitted throughout the controller network itself and from the controller network to the output layer.

Using the spiking neural network may be advantageous compared to other networks as it may have relaxed requirements for the external memory. For example, the memory contents may be represented with low precision since storage of binary values may be sufficient (e.g. no analog storage may be required). This may allow an area-efficient and flexible implementation of the memory. This may also allow to exploit novel storage technologies (e.g. phase-change memory cells). Using the spiking neural network may further be advantageous as it has fewer parameters (e.g., lower number of units) which may potentially lead to shorter training times and less overfitting.

The external memory may be a memory which may be accessed (for reading or writing) while executing the spiking neural network. The execution of the spiking neural network may include, for example, a training or inference of the spiking neural network. The spiking neural network may have state variables which describe the spiking neural network at a given instant of time. The external memory may, for example, be configured to store these state variables.

The read and write weighting vectors $w^r$ and $w^w$ enable an interaction with the external memory using selective read and write operations. The selective reading and writing may, for example, be enabled by read and write heads of the interface. For example, the external memory may include a memory matrix $M(i,j)$. The read access to the external memory may, for example, be formulated as a vector-matrix multiplication of the read weighting vector $w^r$ and the memory matrix $M(i,j)$. The resulting intermediate read vector $r'$ may be formulated as shown in EQUATION 1:

$$r'(j)=M(i,j)^T w^r(i). \quad \text{EQUATION 1}$$

The resulting intermediate read vector $r'$ from EQUATION 1 may be preprocessed in accordance with the present subject matter. For example, a thresholding may be applied on the intermediate read vector $r'$ as shown in EQUATION 2:

$$x(j)=r'(j)-0.5. \quad \text{EQUATION 2}$$

Additionally, in order to enable differentiability, a pseudo derivative may be applied during training of the spiking neural network to obtain a read vector $r$ as shown in EQUATION 3:

$$r(j) = \Theta(x(j)), \text{ where} \frac{\partial \Theta}{\partial x} = 1 - (\tanh(x)^2). \quad \text{EQUATION 3}$$

The read vector $r$ may be used as input to the controller during the training. The read vector $r'$ may be used as input to the controller during the testing or inference of the spiking neural network.

The read weight vectors and write weight vectors may be computed using a predefined addressing scheme that enables access to the external memory. When reading the vector $r'$, the external memory may be addressed depending on the type of memory being used. For example, in case the external memory includes a crossbar array of memristors, the read weighting vector $w^r$ may be defined/represented to the crossbar array structure using digital-to-analog converters (DACs), pulse width modulation (PWM) circuits or, alternatively, a time-to-spike approach. This may enable aspects of the present disclosure to obtain the vector $r'$.

According to some embodiments, the spiking neural network includes spiking neuron apparatuses (e.g. neuromorphic neuron apparatuses described in FIG. 4), wherein a spiking neuron apparatus of the spiking neuron apparatuses includes an accumulation block and an output generation block. The output generation block is configured to use an activation function for generating a current output value based on a current state variable computed by the accumulation block. The accumulation block is configured to compute the current state variable using a previous state variable and previous output value of the apparatus, wherein the interface is configured to convert the retrieved data into a format of an output of the activation function.

For example, the spiking neural network may include multiple layers of neurons, whereon each neuron of the neurons is the neuron apparatus. The present neuron apparatus may maintain or memorize a temporal context of the neuron apparatus using at least two state variables. For example, the present neuron apparatus may use two state variables, where the output value of the apparatus may be a state variable value. The state variables may be maintained by, for example, exchanging them through recurrent connections of the neuron apparatus or by using other means such as memories such as memristive devices e.g. phase-change memory or other memory technologies. In the case of memristive devices, a state variable value may be represented in the device conductance.

The present subject matter may enable an accurate and efficient processing of temporal data. For example, streams of temporal data may directly be fed into the apparatus and independently be processed by the neuron apparatus. The present neuron apparatus may be applicable to tasks such as unsegmented, connected handwriting recognition or speech recognition. In addition, the present subject matter may provide an apparatus that makes the spiking neural network dynamics easy to implement and to train. In particular, the neuron apparatus may enable a fast and simple training of spiking neural networks that are built out of the present apparatus. This could increase the usage of the spiking neural networks for practical applications and make use of many power-efficient neuromorphic spiking neural network chips.

According to some embodiments, the activation function is a step function or a sigmoid function. In case the neuron apparatus uses a step activation function, it may be denoted as spiking neural unit (SNU). In case the neuron apparatus uses a sigmoid activation function, it may be denoted a soft SNU (sSNU). Using a sigmoid function may enable aspects of the present disclosure to generalize the computational advantages of the present system to the non-spiking case while still benefit from the advantages mentioned herein. Using the step function, the output generation block may be a spiking block that generates binary values 0 or 1.

According to some embodiments, the interface is configured to binarize the retrieved data. According to some embodiments, the interface is configured for binarizing the retrieved data comprising computing values from the retrieved data as a Heaviside function of shifted values of said retrieved data.

This may enable a translation of advanced systems into the domain of spiking neurons. For example, this embodiment may enable a modified read approach used to provide binarized input to controller networks and a theoretical solution using pseudo derivatives to tackle the problem of differentiability.

According to some embodiments, the neural network system further includes the memory. The memory includes a neuromorphic memory device with a crossbar array structure that includes input lines and output lines interconnected at junctions via electronic devices.

This embodiment may be advantageous as the spiking neural units may be compatible with various in-memory computation. For example, the present subject matter may be used with different crossbar structures (e.g. flash cells, memristive devices, SRAM, etc.). Using memristive crossbar structures may further speed up computations by the memory-augmented spiking neural network system while reducing energy consumption.

According to some embodiments, the crossbar array structure includes N of said input lines and W of said output lines, where N>1 and W>1, whereby a memory capacity of the neuromorphic memory device is determined by a memory matrix M of dimension N×W.

According to some embodiments, the crossbar array structure includes a single electronic device per junction, wherein the electronic device is a memristive device or memristor. For example, the crossbar array structure may be a set of conductive row wires and a set of conductive column wires that intersect the set of conductive row wires. The conductive column wires may be referred to as column lines and conductive row wires may be referred to as row lines. The intersections between the set of row wires and the set of column wires are separated by memristors.

The memristor refers to a device or cell capable of remembering an amount of a current that has been passed. The memristor remembers a charge amount and a resistance of the memristor may be changed according to the charge amount. That is, the resistance of the memristor may be changed according to a flow and amount of current.

According to some embodiments, the crossbar array structure further includes pulse width modulation circuits, whereby both read heads and write heads of the interface are connected to said input lines via a respective one of the pulse width modulation circuits. According to some embodiments, the crossbar array structure further includes time to spike (TTS) integrators, whereby both read heads and write heads of the interface are connected to said input lines via a respective one of the TTS integrators.

The TTS integrator is configured for: receiving at least one input signal encoding information in arrival time of the input signal at the integrator, weighting the received signal with a weight value corresponding to the arrival time, and integrating the weighted received signal into a current value of a state of the integrator, outputting a signal based on the current value of the state. The TTS may be used to transmit real values of read and write weighting vector $w^r$ and $w^w$ to the external memory. The TTS may be used with different types of the external memory. For example, other resistive memories can be used even without a crossbar architecture.

According to some embodiments, said interface includes read heads connected to said input lines and output lines of the memory, and write heads connected to said input lines. The read heads and write heads may be pointers addressing locations of the memory from which it has to read from and write to.

FIG. 1 is a block diagram of a memory-augmented neural network system (neural network system) 100, in accordance with some embodiments of the present disclosure. The neural network system 100 includes a controller 101, a memory 103, and an interface 102. The interface 102 connects the controller 101 to the memory 103. The controller 101 includes a processing unit, which is configured to execute a spiking neural network; the controller 101 can thus be regarded as a controller network. The execution of the spiking neural network may include, for example, a training or inference of the spiking neural network. The execution of the spiking neural network may include generating read instructions and/or write instructions. The interface 102 is configured for generating read weighting vectors according to the read instructions, coupling read signals, representing the read weighting vectors, into output lines of the memory 103 thereby retrieving data from the memory 103. The interface 102 is further configured for generating write weighting vectors according to the write instructions, coupling write signals, representing the write weighting vectors into input lines of the memory 103, thereby writing data into the memory 103.

The memory 103 is configured so that the controller network may read information from the memory 103 in the form of spikes (binary signals). Note, the processing unit of the controller 101 may for instance be a general-purpose processing unit (e.g., a central processing unit of a standard computer), or include analog circuits. It may notably include a neuromorphic device (not shown). However, here, the memory 103 does not form part of the processing unit. Rather, the memory 103 is configured to serve as an external memory for the controller 101 and its processing unit. Thus, the memory 103 used as external memory should not be confused with other memories that may possibly form part of the controller 101 (or, even, the write and read heads). The neural network system 100 may thus be regarded as a memory-augmented system.

The memory 103 may be configured to store at least part of the information used by the controller network in order to execute the spiking neural network. The memory 103 may, for example, be configured to store information, such as extracted input features, or input-to-label mappings. The access to the memory 103 may or may not involve a multiply-and-accumulate operation.

The interface 102 may typically include multiple read heads 120 and write heads 121 connecting the controller network 101 to the memory 103. The read heads 120 may be connected to both input 130 and output 140 of the memory 103. The write heads 121 may be connected to the input 130 of the memory 103. Various structures of read heads 120 and write heads 121 can be contemplated. Such heads may be implemented in different ways.

In general, the structures of the read heads 120 and write heads 121 may depend on the chosen type of the memory 103. Many variants are available. The read heads 120 and write heads 121 may for instance be represented by a shallow neural network. The read heads 120 receive an input from the controller 101. The structure of this input also depends on the type of memory-augmented neural network. In simple scenarios, the input to the read heads 120 is just the same as the input to the controller network 101. Based on this input, the read heads 120 produce read weighting vectors. The read heads 120 compute the read vectors using the read weighting vectors. These read vectors may for example be the convex combination of a memory matrix and the read weighting vectors.

For example, the read heads 120 may be embodied as a module implementing a shallow neural network, e.g., a two-layer network. That is, this network may include an input layer, whose input nodes are mapped onto outputs 140 from the controller network 101, and an output layer, whose output nodes may be mapped onto input 130 of the memory 103. Similarly, the write heads 121 may be embodied as a module implementing two shallow neural networks. Each of said networks includes an input layer, the input nodes of which are mapped onto outputs 140 from the controller 101, and an output layer, the output nodes of which are mapped onto input 130 of the memory 103. Note, the read/write heads may also be embodied as neuromorphic devices, each having a crossbar array structure. Such neuromorphic devices can adequately be used to implement shallow networks as needed to generate the read and write signals.

The interface 102 may further include an internal memory 123. Values are temporarily stored in the internal memory 123, prior to writing such values in the external memory.

For example, given some input x(t), the controller 101 produces a weight vector which is either stored in the memory 103 (e.g. in a row of a memory matrix Mt of the memory 103), or used to retrieve a particular memory. Read/write memory accesses are determined by respective read and write weighting vectors, based on inputs from the controller 101. Such vectors may be indicative of memory addresses. The memory addresses correspond to specific locations in the memory 103. The read and write weighting vectors may, for example, determine signals needed and where to apply such signals to write to or read from the memory 103, according to a given operation, e.g., a multiply-accumulate for read operations.

Figure 2A:
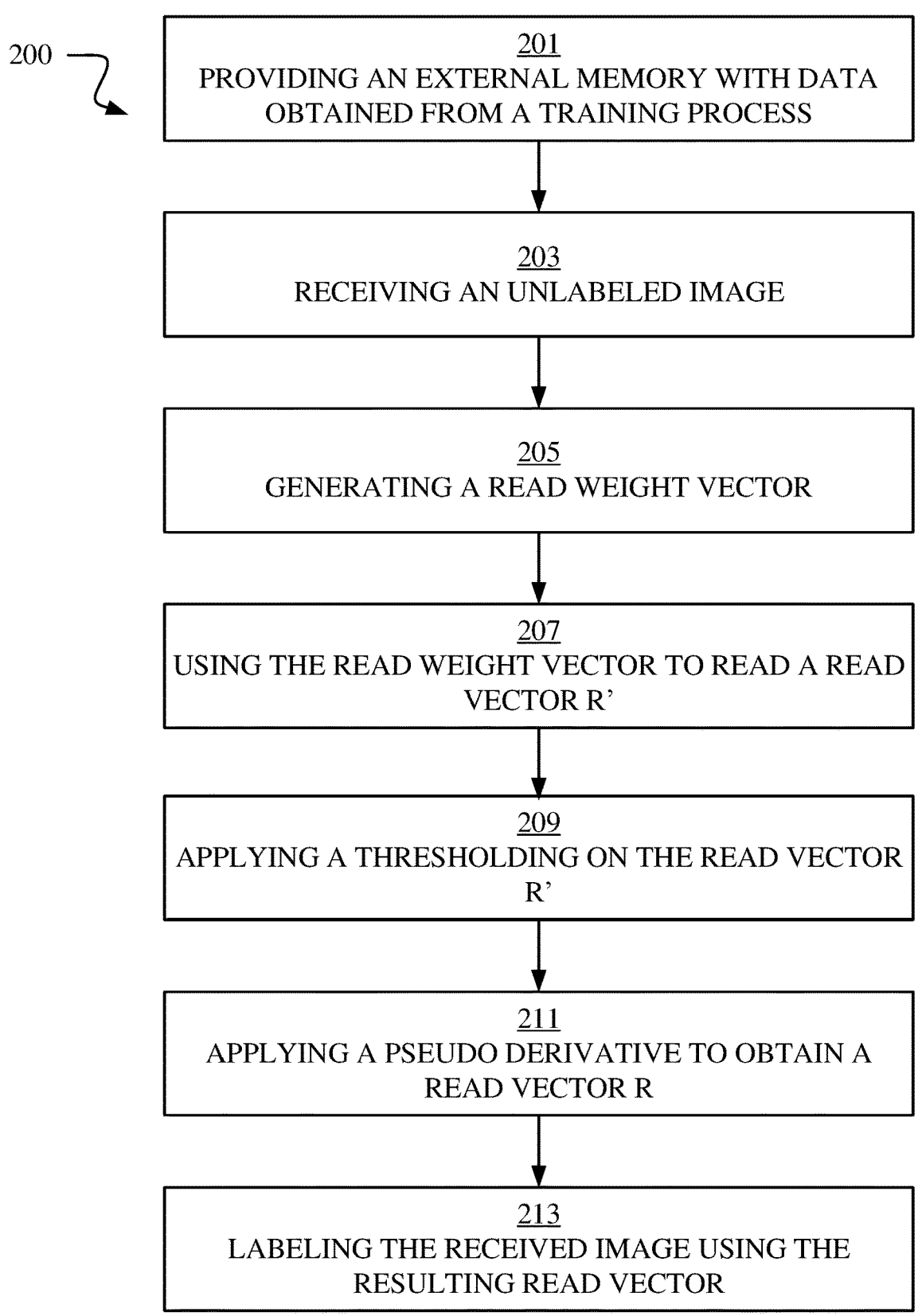
FIG. 2A is a flowchart of a method for executing a spiking neural network, in accordance with some embodiments of the present disclosure.

FIG. 2A is a flowchart of a method 200 for executing a spiking neural network, in accordance with some embodiments of the present disclosure. In this particular example, the execution of the spiking neural network may include inference or testing of the spiking neural network. The inference of the spiking neural network may, for example, enable an image classification.

In step 201, an external memory may be provided, wherein the external memory stores pairs of images x(t) and associated labels y(t) resulting from a training of the spiking neural network. In step 203, the controller network receives an unseen image $\tilde{x}_t$ and no label. The controller may generate one or more read and/or write instructions that enable aspects of the present disclosure to do a classification or labeling of the received image using the spiking neural network. Using the read instructions, the interface may search (e.g. for each read instruction) for similar entries to the image $\tilde{x}_t$ in step 205 from the memory. This step may result in a determination of a read weight vector $w^r$.

Figure 2B:
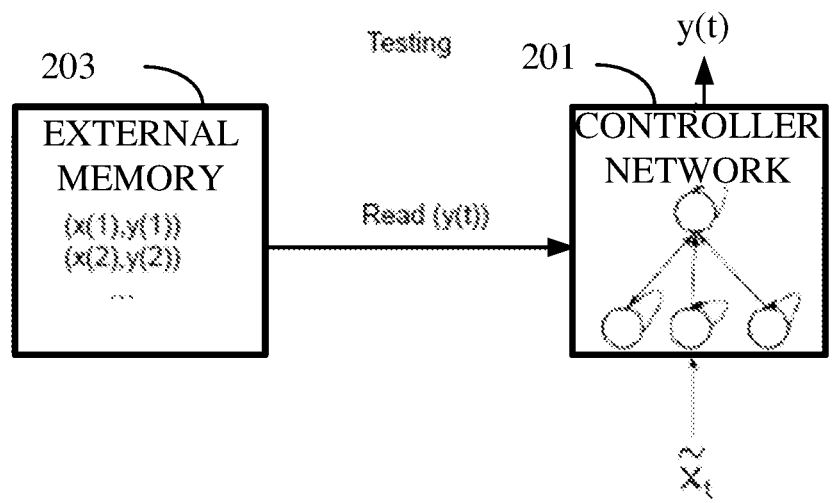
FIG. 2B is a block diagram of an external memory data access, in accordance with some embodiments of the present disclosure.

FIG. 2B is a block diagram of an external memory data access, in accordance with some embodiments of the present disclosure. As illustrated with the diagram of FIG. 2B, the controller network 201 may use the read weight vector $w^r$ in order to read, in step 207, from the external memory 203 an intermediate read vector r', according to EQUATION 4:

$$r'(1) = M(i,j)^T w^r(i) \quad \text{EQUATION 4}$$

EQUATION 4 is indicative of the label y(t) of the received image $\tilde{x}_t$. A thresholding may be applied in step 209 on the intermediate read vector r' as shown in EQUATION 5:

$$x(j) = r'(j) - 0.5. \quad \text{EQUATION 5}$$

In order to enable differentiability a pseudo derivative may be applied in step 211 to obtain the read vector according to EQUATION 6:

$$r(j) = \Theta(x(j)), \text{ where } \frac{\partial \Theta}{\partial x} = 1 - (\tanh(x)^2). \quad \text{EQUATION 6}$$

The pseudo derivative may be used in order to obtain a valid gradient for the read vector r. Step 211 may only be required during training. For testing the SNN, the pseudo derivative may not be needed. The read vector r(j) may be indicative of a label of the received image $\tilde{x}_t$. In step 213, the read label may be provided as a class of the image $\tilde{x}_t$. The training of the spiking neural network may be performed as described with respect to FIG. 2C.

Figure 2C:
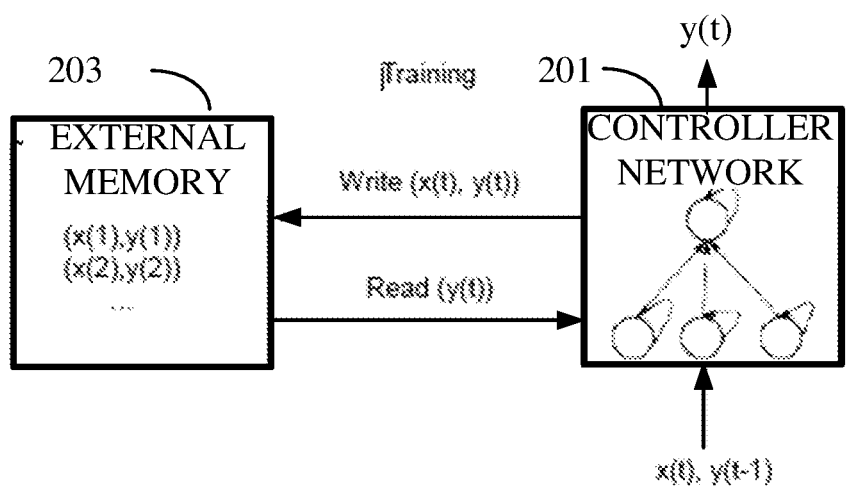
FIG. 2C is a block diagram of an external memory data access, in accordance with some embodiments of the present disclosure.

FIG. 2C is a block diagram of an external memory data access, in accordance with some embodiments of the present disclosure. As illustrated in FIG. 2C, the controller network 201 at time step t is presented with the correct label y(t−1) of the image from the previous time step x(t). This means the controller network 201 at time t receives the input (x(t), y(t−1)) in order to produce the label for the image x(t). The controller network 201 may use the memory 203 to store data indicative of the relation (x(t), y(t)) by using the image from time step t and the label given in the next time step t+1. Since the controller network 201 executes a spiking neural network, the data indicative of the relation (x(t), y(t)) may, for example, be the activity pattern of the hidden units of the spiking neural network. For example, a hidden unit may have an output activation function that depends on an activity pattern of the hidden unit. The output activation function may enable the hidden unit to provide an output (e.g. spike or no spike) based on an input value x(t) and based on the activity pattern. That activity pattern may be obtained during the inference from the memory 203.

Figure 3A:
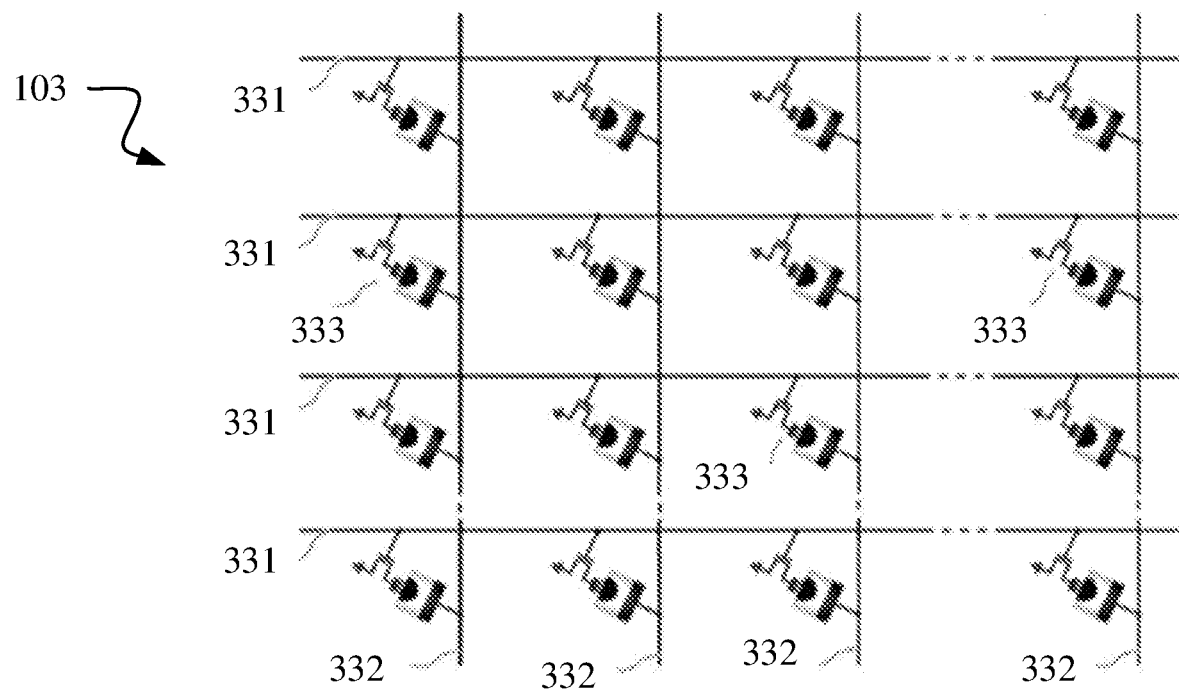
FIG. 3A is a block diagram of a memristive crossbar array of a neuromorphic memory device, in accordance with some embodiments of the present disclosure.

FIG. 3A is a block diagram of a memristive crossbar array of a neuromorphic memory device, in accordance with some embodiments of the present disclosure. FIG. 3A depicts a crossbar array structure of memristors that provide local data storage. For example, the memory 103 includes a neuromorphic memory device which has said crossbar array structure. The crossbar array structure, e.g., memory 103, includes input lines 331 and output lines 332, where the lines 331, 332 are interconnected at junctions via electronic devices 333 (e.g., memristive devices). The electronic devices 333 are programmed so as to incrementally change states of the devices 333. This is achieved by coupling write signals into one or more of the input lines 331 of the crossbar array structure, e.g., memory 103. The write signals are generated based on write weight vectors that are generated by the interface 102. The write weight vectors are themselves generated according to write instructions from the controller 101. When needed, data can be retrieved from the memory 103, according to a multiply-accumulate operation. This is achieved by coupling read signals input lines 331, based on read weight vectors generated by the interface 102. The read weight vectors are themselves generated according to read instructions from the controller 101.

Each electronic device 333 of the neuromorphic device may possibly include one or more memristive devices. Also, dual output lines (columns) may be involved, one to store positive values, and another to store negative values, as usual in the art. Several types of memristive devices may be contemplated, such as PCM cells, resistive random-access memory (RRAM), static random-access memory (SRAM) cells, or electro-chemical random-access memory (ECRAM) cells. In other variants, flash cells may be used.

Programming the electronic devices 333 results in incrementally change states of the devices 333 (e.g., change the electrical conductances of the devices 333). The states of the electronic devices 333 correspond to certain values, which determine data as stored on the memory 103. Reading from memory 103 of FIG. 3A is achieved via a vector-matrix multiplication, which can be performed in constant time, meaning that data may possibly be retrieved during any operation cycle. In practice, however, read operations may only be performed at specific times (according to the general algorithm run at the controller) and not necessarily at each operation cycle. In all cases, data can be retrieved via a multiply-accumulate operation, which is parameterized by values corresponding to the states of the electronic devices 333. This way, data can be stored on the external memory and such data can be recalled by the controller 101, as needed to perform tasks supervised by the controller 101.

Figure 3B:
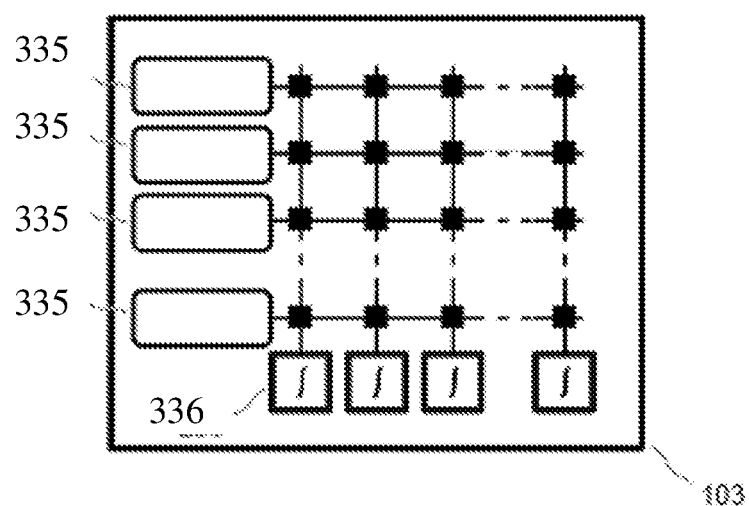
FIG. 3B is a block diagram of a neuromorphic memory device, in accordance with some embodiments of the present disclosure.

FIG. 3B is a block diagram of a neuromorphic memory device, in accordance with some embodiments of the present disclosure. As also seen in FIG. 3B, the crossbar array structure, e.g., memory 103, may, for example, include N input lines 331 and W output lines 332, where N>1 and W>1. In that case, the memory capacity of the memory 103 is determined by a memory matrix M of dimension N×W.

Figure 3C:
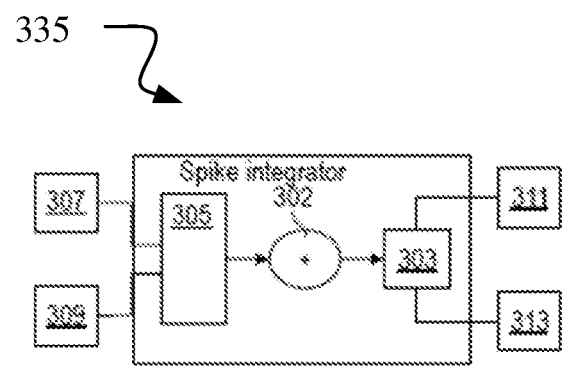
FIG. 3C is a block diagram of an example time to spike integrator, in accordance with some embodiments of the present disclosure.

Inputs to the crossbar array structure, e.g., memory 103, can for instance be achieved using digital-to-analog converters (DACs), pulse width modulation (PWM) circuits or, alternatively, time-to-spike integrators 335. The PWM circuits 335 may be used to controllably generate the signals needed to write to and read from the memory 103. Both the read heads and the write heads may be connected to the input lines 331 via a respective PWM circuit 335. In variants, a time-to-spike (TTS) approach can be used. That is, a low-latency TTS integrator as shown in FIG. 3C may be used, which makes use of the timing of the signals to more efficiently transmit the information. The read heads may otherwise be connected to output of the crossbar structure to read result from the multiply-accumulate operations and return such results to the controller 101. Standard readout circuits 336 can be used to read output currents from the output lines 332.

FIG. 3C is a block diagram of an example TTS integrator 335, in accordance with some embodiments of the present disclosure. The TTS integrator 335 receives and processes incoming signals such as incoming spikes. For example, for at least one incoming signal received, the TTS integrator 335 integrates a corresponding value of the received signal into a membrane state variable (e.g. referred to herein as membrane potential variable) Vm of the TTS integrator 335.

The TTS integrator 335 includes a selection unit 305, an adder 302, and a memory 303. The memory 303 maintains a temporary variable representing the membrane potential variable Vm of the TTS integrator 335.

For example, a spike $s_i$ that corresponds to the received signal may pass through a synapse unit 309 with a weight $w_1$ and the value of the received signal may be equal to $w_i \times s_i$, which is the result of multiplication of $s_i$ by $w_i$. The synaptic unit 309 is further configured to provide the TTS integrator 335 with the value $x_i = w_i \times s_i$. In a spiking neural network, $s_i$ may have values 0 or 1. The selection unit 305 selects for each received signal $x_i$ a weight value (or modulating term) $\alpha_i$ that corresponds to the arrival time of the received signal $x_i$ and performs a multiplication of the selected weight value and a value of the received signal. The selection unit 305 outputs the result of the multiplication.

The adder 302 is configured to receive said result of multiplication from the selection unit 305 and to add or integrate that received result of multiplication into the membrane potential variable Vm of the TTS integrator 335.

The TTS integrator 335 further includes a comparator 313. The comparator 313 is configured to determine whether the membrane potential variable Vm of the TTS integrator 335 is greater than or equal to a threshold value. The threshold value may, for example, be received from a unit (not shown) of TTS integrator 335 or may be stored in the comparator 313. The TTS integrator 335 is configured to spike when the membrane potential variable Vm is greater than or equal to the threshold value.

The TTS integrator 335 further includes a reset unit 311. When the TTS integrator 335 spikes, the reset unit 311 is configured to set the membrane potential variable Vm to a reset value e.g. to a stored reset value.

The TTS integrator 335 further includes a weight unit 307 configured to provide weight values $\alpha_i$ to the selection unit 305. The weight unit 307 may, for example, include a lookup table comprising the weight values $\alpha_i$ in association with time values. In another example, the weight values may be generated in accordance with the predefined time dependent function by a generator circuit, of the weight unit, providing continuous signal. The weight values $\alpha_i$ may be obtained from a predefined time dependent function. For example, for an arrival time of a received signal, the function may provide its corresponding weight value $\alpha_i$.

Hence, the TTS integrator 335 may weight a received signal with a weight value corresponding to the arrival time of the received signal, integrate the weighted received signal into a current value of a state of the TTS integrator 335 and output a signal based on the current value of the state.

Figure 4:
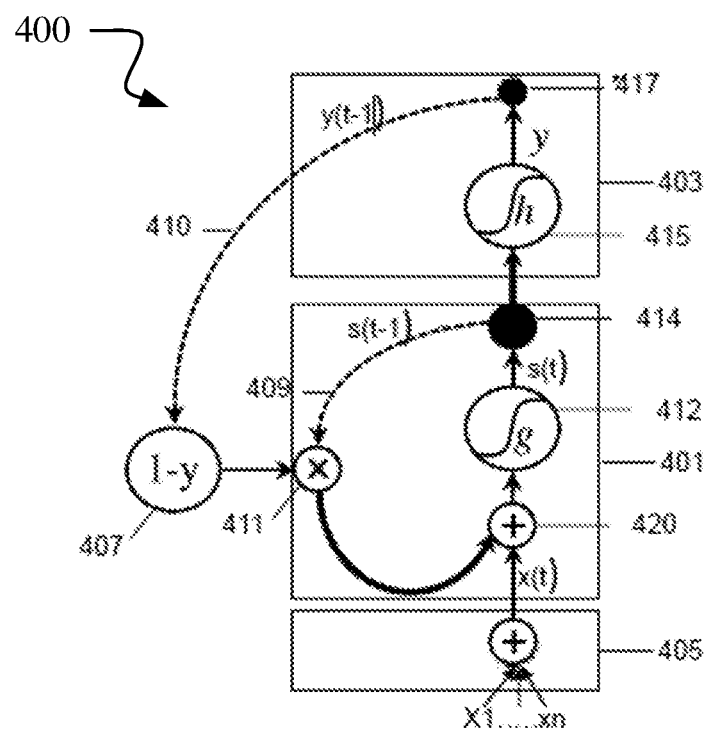
FIG. 4 is a block diagram of an example implementation of a neuromorphic neuron apparatus, in accordance with some embodiments of the present disclosure.

FIG. 4 is a block diagram of an example implementation of a neuromorphic neuron apparatus 400, in accordance with some embodiments of the present disclosure. FIG. 4 shows the status of the neuromorphic neuron apparatus 400 after receiving a signal x(t).

The neuromorphic neuron apparatus 400 includes an accumulation block 401 and an output generation block 403. The neuromorphic neuron apparatus 400 further includes a summing block 405.

The summing block 405 is configured to receive weighted input values W(x1)*x1, W(x2)*x2 ... W(xn)*xn representative of an object at time t (e.g. an image). The summing block 405 may be configured to perform the sum of the received weighted values x(t)=W(x1)*x1+W(x2)*x2+ ... W(xn)*xn, and the resulting variable value x(t) is provided or output by the summing block 405 to the accumulation block 401.

The accumulation block 401 includes an adder circuit 420, multiplication circuit 411, and activation circuit 412. The multiplication circuit 411, also referred to herein as multiplication logic, may for example be a reset gate. The accumulation block 401 may be configured to output at the branching point 414, the computed state variable in parallel to the output generation block 403 and to the multiplication logic. The connection 409 between the branching point 414 and the multiplication logic is shown as a dashed line to indicate that the connection 409 is with a time-lag. That is, at the time the neuromorphic neuron apparatus 400 is processing a received signal x(t) to generate corresponding s(t) and y(t), the connection 409 may transmit a value of a previous state variable s(t−1).

The output generation block 403 may include an activation logic 415, also referred to herein as an activation circuit. The output generation block 403 may be configured to receive a state variable from the accumulation block 401. Based on the received state variable, the output generation block 403 may generate and provide or output an output value at a branching point 417 in parallel to another neuron apparatus, and to a reset module 407 of the neuromorphic neuron apparatus 400. The reset module 407 may be configured to generate a reset signal from the received output value and provide the reset signal to the multiplication logic. For example, for a given output value y(t−1), the reset module may generate a reset signal indicative of a value 1−y(t−1). The connection 410 is shown as a dashed line to indicate that the connection 410 is with a time-lag. That is, at the time the neuromorphic neuron apparatus 400 is processing a received signal x(t) to generate corresponding s(t) and y(t), the connection 410 may transmit a previous output value y(t−1). In an alternative implementation of the connection 410, the external memory may be accessed as described herein to retrieve the output value y(t−1). The connections 409 and 410 may enable a feedback capability to the neuromorphic neuron apparatus 400. In particular, the connection 409 may be a self-looping connection within the accumulation block and the connection 410 may activate a gating connection for performing the state reset.

Upon receiving the state variable value s(t−1) and the output value y(t−1), the multiplication logic may be configured to compute an adjustment according to EQUATION 7:

$$l(\tau) \odot s(t-1) \odot (1-y(t-1)). \qquad \text{EQUATION 7}$$

The adjustment computed by the multiplication circuit 411 is output and fed to the adder circuit 420. The adder circuit 420 may be configured to receive the adjustment from the multiplication circuit 411 and the signal x(t) from the summation block 405. The adder circuit 420 may further be configured to perform the sum of the received adjustment and the signal according to EQUATION 8:

$$x(t)+l(\tau)\odot s(t-1)\odot(1-y(t-1)). \quad \text{EQUATION 8}$$

This sum is provided or output by the adder circuit 420 to the activation circuit 412. The activation circuit 412 may be configured to receive the computed sum from the adder circuit 420. The activation circuit 412 may be configured to apply its activation function on the computed sum in order to compute the state variable s(t) according to EQUATION 9:

$$s(t)=g(x(t)+l(\tau)\odot s(t-1)\odot(1-y(t-1))). \quad \text{EQUATION 9}$$

The resulting state variable s(t) may be output in parallel to the activation circuit of the output generation block 403 and to the multiplication circuit 411 (the outputting to the multiplication circuit 411 may be useful for a next received signal x(t+1)). The activation circuit may be configured to receive the state variable s(t) and to generate from the state variable s(t) an output value y(t) using its activation function. The generated output value may be output to the reset module 407 for usage for a next received signal x(t+1).

Figure 5:
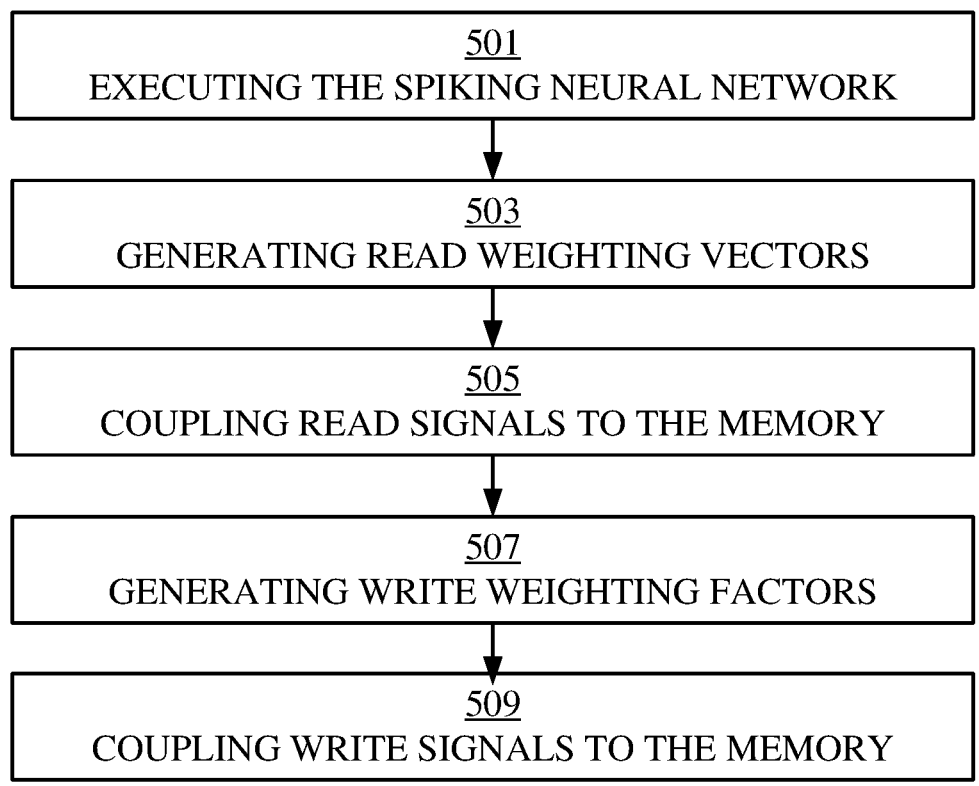
FIG. 5 is a flowchart of a method for executing a spiking neural network, in accordance with some embodiments of the present disclosure.

FIG. 5 is a flowchart of a method 500 for executing a spiking neural network, in accordance with some embodiments of the present disclosure. The method 500 may execute a spiking neural network using the neural network system 100 of FIG. 1, e.g. In step 501, the controller 101 may execute the spiking neural network. The execution of the spiking neural network includes a generation of read instructions and/or write instructions. In step 503, the interface 102 may generate read weighting vectors according to the read instructions and may couple in step 505 read signals, into output lines of the memory 103, thereby retrieving data from the memory 103. The read signals represent the read weighting vectors respectively. Steps 503 and 505 may be performed if the read instructions are generated in step 501. In step 507, the interface 102 may generate write weighting vectors according to the write instructions and may couple in step 509 write signals into input lines of the memory 103, thereby writing data into the memory 103. The write signals may represent the write weighting vectors respectively. Steps 507 and 509 may be performed if the write instructions are generated in step 501.

Figure 6:
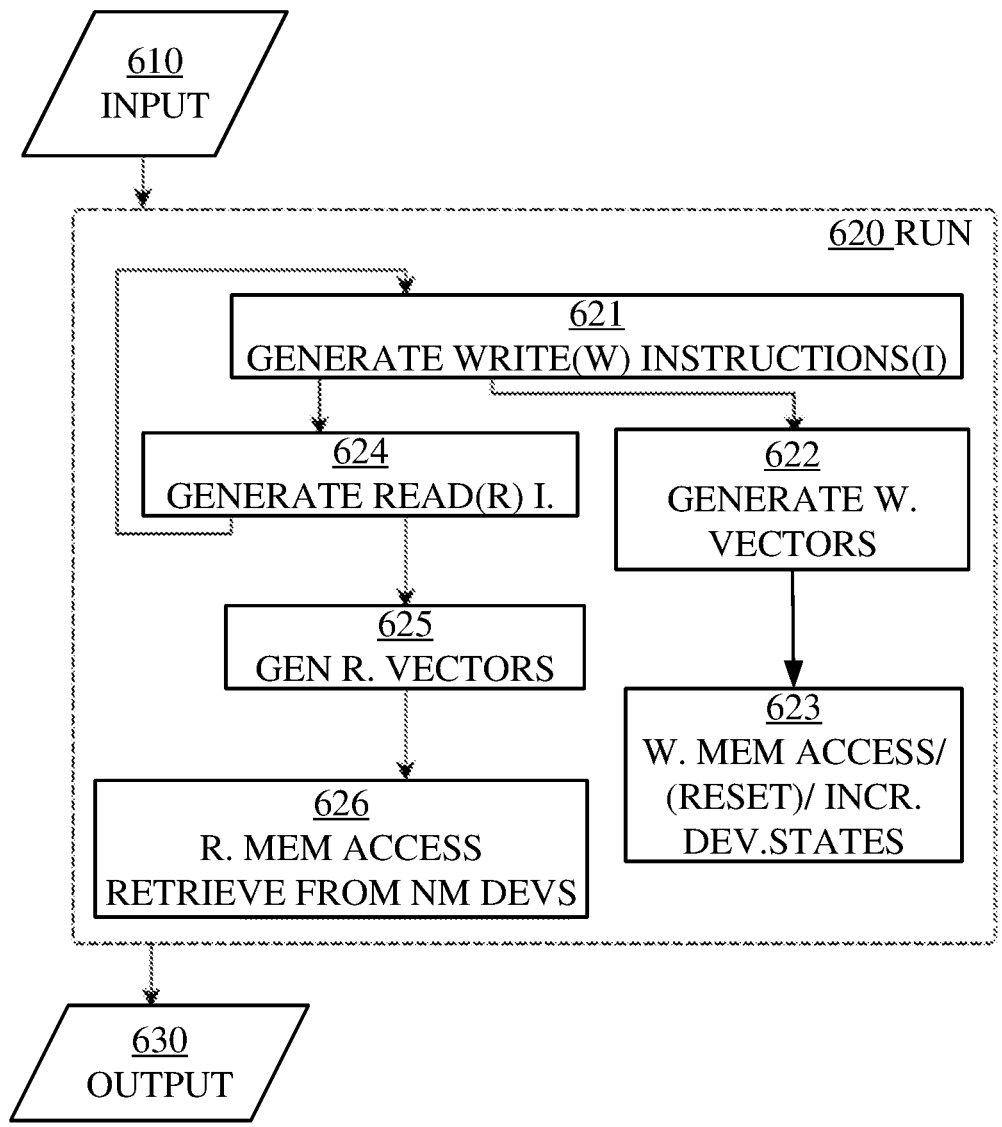
FIG. 6 is a flowchart of a method of operating a neural network system, in accordance with some embodiments of the present disclosure.
Figure 7:
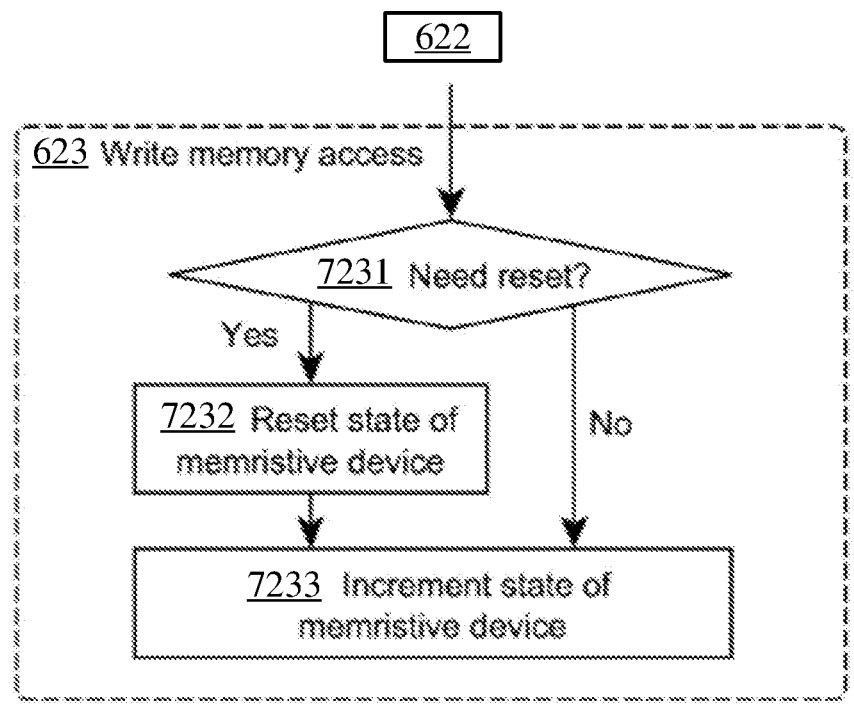
FIG. 7 is a flowchart of a method for write memory access, in accordance with some embodiments of the present disclosure.
Figure 8:
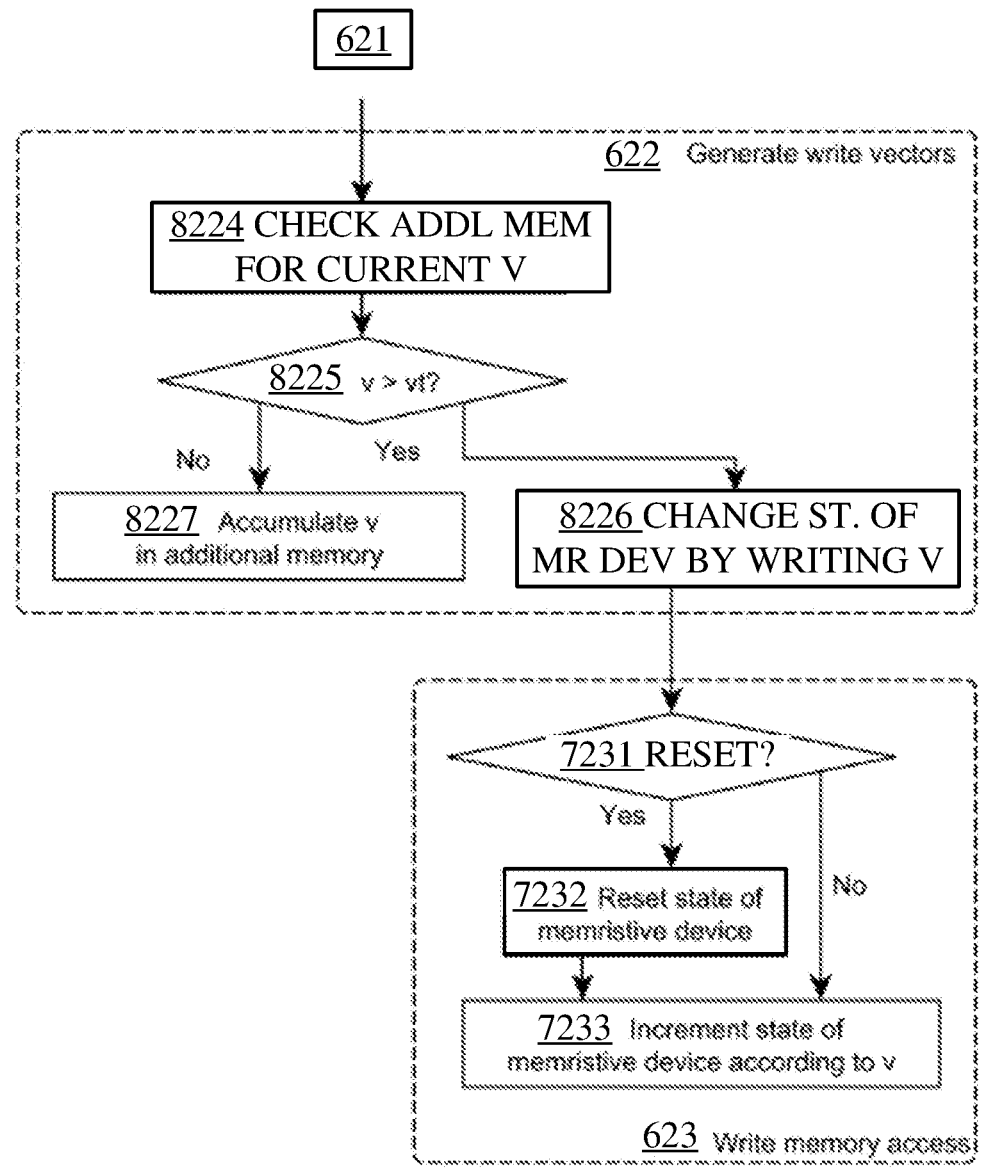
FIG. 8 is a flowchart of a method for incrementally changing states of an electronic device, in accordance with some embodiments of the present disclosure.

An example hardware-implemented method of operating the neural network system 100 is depicted in the flowcharts of FIGS. 6-8. In this example method, the neural network system 100, includes a neuromorphic memory device with a crossbar array structure as described in FIGS. 3A-3B.

FIG. 6 is a flowchart of a method of operating a neural network system, in accordance with some embodiments of the present disclosure. The electronic devices 333 of the neuromorphic memory device are programmed 621-623 so as to incrementally change 623 states of the devices 333. This is achieved by coupling write signals into one or more of the input lines 331 of the crossbar array structure, e.g., memory 103. The write signals are generated based on write vectors that are generated 622 by the interface 102. The write vectors are themselves generated according to write instructions 621 from the controller 101.

When needed, data can be retrieved 624-626 from the neuromorphic memory device according to a multiply-accumulate operation. This is achieved by coupling read signals into one or more of the input lines 331 of the neuromorphic memory device, based on read vectors generated 625 by the interface 102. The read vectors are themselves generated according to read instructions 624 from the controller 101.

The processing unit of the controller 101 is configured to implement and execute a neural network. Note, the processing unit may for instance be a general-purpose processing unit (e.g., a central processing unit of a standard computer), or include analog circuits. It may notably include another neuromorphic device (not shown). However, here, the neuromorphic memory device does not form part of the processing unit. Rather, the neuromorphic device is configured to serve as an external memory for the controller 101 and its processing unit. Thus, the neuromorphic device used as external memory should not be confused with other neuromorphic devices that may possibly form part of the controller 101 (or, even, the write and read heads, as discussed later). The neural network system 100 can thus be regarded as a memory-augmented system, in which the external memory is embodied as a crossbar array structure. The latter is preferably a memristive crossbar structure, which may possibly use low precision (i.e., a single memristive element may be used to represent a memory element).

More generally, however, each electronic device 333 of the neuromorphic device may possibly include one or more memristive devices. Also, dual output lines (columns) may be involved, one to store positive values, and another to store negative values, as will be appreciated by one skilled in the art. Several types of memristive devices may be contemplated, such as PCM cells, resistive random-access memory (RRAM), static random-access memory (SRAM) cells, or electro-chemical random-access memory (ECRAM) cells. In other variants, flash cells may be used.

As described above, the interface 102 typically includes multiple read/write heads connecting the controller 101 to the memory 103. Such heads may be implemented in different ways. They may notably be implemented as a shallow neural network, as discussed later.

According to the present approach (described in FIGS. 6-8), the write process is simplified to an incremental write process, such that there is no need to read contents of the external memory prior to writing (at least for the purpose of programming the cells). Only full memory resets of the electronic devices may be required, as in embodiments discussed below, while an incremental writing is otherwise implemented. That is, programming the electronic devices 333 results in incrementally change states of the devices 333 (e.g., change the electrical conductances of the devices 333). The states of the electronic devices 333 correspond to certain values, which determine data as stored on the neuromorphic device.

Note, incremental write processes as contemplated herein may notably involve incremental programming processes, whereby conductance states of the electronic devices are incremented in small, constant steps. In variants, the incremental write processes rely on iterative programming, whereby electronic devices are programmed using multiple pulses in an iterative manner In other variants, incremental values are accumulatively stored in an additional memory 123, prior to writing such values, as in embodiments discussed later.

Reading from memory may be achieved via a vector-matrix multiplication, which can be performed in constant time, meaning that data may possibly be retrieved during any operation cycle. In practice, however, read operations will only be performed at specific times (according to the general algorithm run at the controller) and not necessarily at each operation cycle. In all cases, data can be retrieved via a multiply-accumulate operation, which is parameterized by values corresponding to the states of the electronic devices 333. This way, data can be stored on the external memory formed by the neuromorphic device and such data can be recalled by the controller 101, as needed to perform 620 tasks supervised by the controller 101.

Read/write memory accesses are determined by respective read/write vectors, based on inputs from the controller 101. Such vectors can be compared to memory addresses. However, while memory addresses correspond to specific locations in a usual hardware memory, here the read/write vectors determine signals needed and where to apply such signals to write to or read from the memory 103, according to a given operation, e.g., a multiply-accumulate for read operations. Note, physical addresses of the electronic devices 333 are needed in the present cases too as the read/write operations require having access to each electronic device 333, individually. Inputs to the crossbar array structure, e.g., memory 103, can for instance be achieved using digital-to-analog converters (DACs), pulse width modulation (PWM) circuits 335 or, alternatively, a time-to-spike approach.

The present approach (described in FIGS. 6-8) brings several advantages. First, a memory-augmented neural network system 100 such as disclosed herein can efficiently utilize crossbar structures, where the in-memory computation capabilities allow read and write operations from memory to be performed in constant time. Second, the proposed approach is not limited to memristive technologies; other technologies like flash cells can be contemplated. Third, the proposed write access removes the need to read the external memory prior to a writing cycle (no partial reset of the memory cells is needed). This enables full compatibility with known crossbar structures based on memristive devices, e.g., PCM devices. Thus, the proposed solution allows memory accesses to be significantly sped up while reducing energy consumption in memory-augmented neural networks.

Notwithstanding the incremental write approach, the differentiability of the system can be restored, if necessary, by utilizing pseudo-derivatives, as in embodiments discussed below. And as noted earlier, the memory contents can be represented with low precision (e.g., 4 bits are sufficient). This approach allows an area-efficient implementation of the memory, as a single electronic device per junction suffices. However, the precision of the memory may be improved by using multiple memristive elements per junction, if necessary.

All this is now described in detail, in reference to some embodiments of the disclosure. Referring now to FIGS. 6, 7, the programming 621-623 of the electronic devices 333 may further include performing 623 an erase operation (i.e., a reset), prior to incrementally changing the states of one or more of the electronic devices 333. The erase operation is determined by the write vectors. Such an erase operation can, in the present case, only consist in fully erasing an electronic device 333, so as to reset a state of this device. Several devices 333 may need to undergo such an erase operation, this depending on data to be written to the memory 103, as determined by the write vectors. In some embodiments, other devices 333 (typically the majority of such devices) may simply be incremented, at each writing cycle, without it being required to reset them.

In other words, a binary type of erase operations is contemplated, which can either be a full erase or a no erase of values stored on the electronic devices 333. Values stored on the electronic devices corresponds to states of these devices. For erasing a cell, a reset pulse is applied, e.g., an amorphization pulse for a PCM cell. One may for example need to reset an electronic device 333 to zero when one needs to subtract a value. Next, an additive term is written to the cell, which term is computed as the final value, i.e., corresponding to the difference between the initial value and the subtrahend.

In fact, the present methods (of FIGS. 6-8) may be designed and performed so as to prevent any partial erasing of any of the electronic devices 333, at least for the purpose of programming 621-623 the electronic devices 333 (i.e., for writing thereto). That is, the method may be designed so as to guarantee that no memory read access is needed for the purpose of writing to the cells. Note, however, that the overall algorithm run by the controller 101 may require to read data from the memory, prior to writing data to the memory, as per vagaries of this algorithm. However, it remains that the basic memory writing process may be designed so as not to require reading memory contents prior to writing to the cells (to update the memory contents). In particular, the write vectors can be generated 622 by the interface 102 without any memory read access being required, i.e., without having to first retrieve data from the neuromorphic memory device. That is, step 622 can be, per se, independent from steps S24-S26.

As seen in FIGS. 1, 3A-3B, the crossbar array structure, e.g., memory 103, of the neural network system 100 may for example include N input lines 331 and W output lines 332, where N>1 and W>1. In that case, the memory capacity of the neuromorphic memory device is determined by a memory matrix M of dimension N×W. Note that, in variants, the present approach may also be applied to a single input line, and/or a single output line. In addition, dual output lines may be needed, as noted earlier.

In embodiments, the write signals are generated according to two operations, which are based on two types of write vectors. The first operation determines the extent of the erase operation (i.e., whether to fully reset or not reset at all), while the second operation is performed to incrementally change states of the electronic devices 333, as assumed in FIG. 7.

FIG. 7 is a flowchart of a method for write memory access, in accordance with some embodiments of the present disclosure. That is, if a write vector of the first type implies that a reset is needed 7231 for a given device 333, this device is reset 7232, prior to incrementally changing 7233 its state, according to the write vector of the second type. Else, if no reset is needed, the state of this device 333 is directly incremented 7233. In other words, the write access is separated into an erase part and an additive part.

For example, the first operation may involve the memory matrix multiplied by a binary value vector, where the binary value vector determines the extent of the binary erase operation (i.e., either no erase or a full erase), while the second operation involves an additive term to incrementally change states of the electronic devices 333. That is, two types of vectors are used, i.e., call them vectors eT and vT, which enable two operations (a sum of operations).

In addition, the programming may further involve binarizing values of components of the vector eT. The binarizing can be written as shown in EQUATION 10:

$$M[i,j]=M[i,j](1-Ee'T[j])+EvT[j], \text{ where } E \in 1N \times 1 \text{ and } e'[j] \in (0,1)W \times 1.$$ EQUATION 10

Note, e' denotes a binarized vector. The binary vector component e'[j] can be obtained by binarizing the usual vector component e[j]. The terms Ee'T and EvT can be regarded as modified write keys, which can be generated in different ways, depending on the architecture at hand (e.g., Differentiable Neural Computer [DNC], Neural Turing Machine [NTM], etc.).

In embodiments, the binarization is achieved by computing the values of components of the vector eT as a Heaviside function of shifted values of the vector components. One may for example use EQUATION 11:

$$e'[j]=\Theta(e[j]-0.5). \qquad \text{EQUATION 11}$$

In variants, one may use two Heaviside functions, or even comparator circuits, to achieve similar results, as the skilled person may appreciate. Note, a direct implementation of the present approach may come at the cost of losing differentiability, which may impair the training (e.g., for applications to supervised learning based on the backpropagation algorithm). Still, pseudo derivatives can be relied on, to restore the differentiability and thus the error backpropagation algorithm. For example, one may consider using an analytic approximation to the Heaviside function e.g., EQUATION 12:

$$\Theta(x)\approx(1+\tanh(kx))/2, \qquad \text{EQUATION 12}$$

with a sufficiently large value of k, yielding the derivative $$\frac{\partial \Theta}{\partial x} \approx \frac{k}{2}(1-(\tanh(kx)^2)).$$

In variants, one may use, for example, EQUATION 13:

$$(x) \approx \frac{1}{2} + \frac{1}{\pi}\arctan(kx) \qquad \text{EQUATION 13}$$

Thus, a simplified write approach can be involved, where either no erase or a full erase is performed, prior to incrementing states of the devices 333. Meanwhile, the memory content does not need to be read prior to writing. In addition, a thresholding approach can be used to restore the differentiability (using pseudo derivatives).

As said, the general algorithm run by the controller 101 may nevertheless need to read contents from the device (other than to write contents thereto). As illustrated in FIG. 6, data is retrieved 624 from the neuromorphic memory device according to a multiply-accumulate operation. For example, a read vector wr is generated 625 by the interface 102 and multiplied by the memory matrix M. Again, the vectors wr are read keys that can be generated in different ways, depending on the architecture at hand. Each read results r is obtained through a multiplication of the vector wr by the memory matrix M. This operation can be written as shown in EQUATION 14:

$$r[j]=\Sigma_{i=1}^{N}M[i,j]^T w^r[i]. \qquad \text{EQUATION 14}$$

In other words, read access to the memory can be formulated as a vector-matrix multiplication, where the memory M is represented by a crossbar array of dimension N×W. The vector $w^r$ can notably be represented to the crossbar structure using digital-to-analog converters (DACs), or a simple PWM circuitry 335. In further variants, a time-to-spike (TTS) implementation can be relied on, as discussed later.

FIG. 8 is a flowchart of a method for incrementally changing states of an electronic device, in accordance with some embodiments of the present disclosure. As noted earlier, the incremental write approach is not incompatible with accumulative programming. For instance, referring to FIG. 8, the additive terms involved in the second operation may be performed by accumulating 8227 additive values v for said additive terms, in an additional memory 123 distinct from the external memory (see FIG. 1). Again, such additive values are determined by the second types of write vectors. In operation, after checking 8224 a current value v of a given additive value: if the accumulated additive values v happens to exceed 8225 a given threshold vT, the algorithm instructs 8226 to incrementally change a state of a given electronic device 333 according to this accumulated additive value v. Thus, for small values of v, there is the possibility to accumulate v locally (in the additional memory 123) and apply it only in subsequent steps. The accumulation process can be performed as part of the write vector generation 622, as assumed in FIG. 8. Then, the algorithm goes on as explained earlier in reference to FIG. 7.

Note, in variants, updates may also be applied with some granularity during the write process. Such updates may be useful for hardware architectures that only support updates of a fixed size, for example PCM devices. As a result, a certain value ṽ may happen to be applied, which slightly differs from the ideal value v. In such cases, the difference v−ṽ may also need to be stored in the additional memory 123. Such variants could benefit to certain types of hardware, such as PCM-based implementations, or any other hardware that only allow applying pulses with a certain fixed power, which corresponds to a fixed-value increment.

In typical applications, the processing unit of the controller 101 runs 620 an algorithm that causes the system 100 to interleave steps of programming 621-623 the electronic devices 333 and retrieving 624-626 data from the neuromorphic memory device. This algorithm may notably be run to train a neural network. This, in operation, causes the processing unit to execute the neural network multiple times. For example, inputs 610 as stored on the neuromorphic memory device may be fed into input nodes of the neural network, prior to executing said neural network. Executing the neural network leads to outputs 630 that are stored on the neuromorphic memory device, and so on.

Referring back FIGS. 1, 3A-3B, another embodiment of the disclosure is now described, which concerns the neural network system 100 per se. The system 100 includes a controller 101, which itself includes a processing unit. The latter is configured to execute a neural network. The system 100 further includes a memory 103 (i.e., an external memory) that includes the neuromorphic memory device. As said, the memory 103 has a crossbar array structure that includes input lines 331 and output lines 332. The lines are interconnected at junctions via electronic devices 333. The system 100 further includes an interface 102, which connects the controller 101 to the memory 103.

The system 100 is generally configured to program the electronic devices 333 to incrementally change states thereof. As explained in reference to the present methods, this is achieved by coupling write signals into one or more of the input lines 331. Such signals are generated based on write instructions from the controller 101 and write vectors generated by the interface 102 according to such write instructions, in operation. In addition, data is retrieved from the neuromorphic memory device according to a multiply-accumulate operation, by coupling read signals into one or more of the input lines 331 of the neuromorphic memory device. The read signals are generated based on read instructions from the controller 101 and read vectors generated by the interface 102 according to such read instructions.

In embodiments, the system 100 is further configured to perform erase operations, prior to incrementally changing the states of the electronic devices 333. As already explained, said erase operations are determined by the write vectors, whereby each erase operation can only consist of fully erasing one of the electronic devices 333 or not erasing at all this electronic device 333. Fully erasing an electronic device causes to reset a state thereof, in operation. Even more so, the neural network system 100 may be configured so as to prevent any partial erasing of any of the electronic devices 333 (at least for the purpose of programming, i.e., writing to such electronic devices 333), in operation of the system.

As seen in FIGS. 3A-3B, the crossbar array structure typically includes N input lines 331 and W output lines 332, where N>1 and W>1, whereby a memory capacity of the neuromorphic memory device is determined by a memory matrix M of dimension N×W. The crossbar array structure preferably includes a single electronic device per junction, where each of the electronic devices may for instance be a memristive device, i.e., a memristive memory element. The content of the memory can indeed be represented with limited precision (e.g., 4 bits), which allows advantages of a memristive crossbar implementation to be fully exploited.

As noted earlier, the interface 102 may include read heads, which are connected to both the input lines 331 and the output lines 332, as well as write heads connected to the input lines 331. Various structures of read heads and write heads can be contemplated, as discussed earlier.

In embodiments, the crossbar array structure further includes PWM circuits 335, as depicted in FIG. 3B. The PWM circuits are used to controllably generate the signals needed to write to and read from the memory 103. Both the read heads and the write heads are connected to the input lines 331 via a respective PWM circuit 335. In variants, a time-to-spike (TTS) approach can be used. That is, a low-latency TTS integrator may be used, which make use of the timing of the signals to more efficiently transmit the information.

The read heads are otherwise connected to output of the crossbar structure to read result from the multiply-accumulate operations and return such results to the controller 101. Standard readout circuits 336 can be used to read output currents from the output lines 332.

Interestingly, the read heads can possibly be embodied as a module implementing a shallow neural network, e.g., a two-layer network. That is, this network may include an input layer, whose input nodes are mapped onto outputs from the controller 101, and an output layer, whose output nodes are mapped onto input lines 331 of the crossbar array structure. Similarly, the write heads may be embodied as a module implementing two shallow neural networks. Each of said network includes an input layer, the input nodes of which are mapped onto outputs from the controller 101, and an output layer, the output nodes of which are mapped onto input lines 331 of the crossbar array structure, e.g., memory 103. This makes it possible to output two types of write vectors, based on which the system 100 can perform the two operations described earlier. That is, the first type of operations determines erase operations, while the second type of operations aims at incrementally changing states of the electronic devices 333. Note, the read/write heads may also be embodied as neuromorphic devices, each having a crossbar array structure. Such neuromorphic devices can adequately be used to implement shallow networks as needed to generate the read and write signals.

The above embodiments have been succinctly described in reference to the accompanying drawings and may accommodate a number of variants. Several combinations of the above features may be contemplated. For example, in embodiments, a memristive crossbar structure (with PCM cells) is used together with optimized read/write heads to achieve an external memory for the controller 101 and its processing unit. The controller is aimed at executing a neural network, be it to train the latter or perform inferences based on the trained network. Such a neural network can thus be augmented with memory built on memristive devices 333. The memory contents can be represented with low precision or even with binary values stored in the memristive devices. A simplified write approach is relied on, to perform memory write accesses without reading current contents of the memory array 103 and without partial resets of the memristive devices 333.

The present approach can for example be applied to a so-called copy-repeat task. The architecture adopted can for example be the following. In some embodiments, the controller 101 can be a recurrent controller network (which includes 10 LSTM units, instead of 64 LSTM units), together with an external memory device of memory size 16×16, as well as four read heads and one write head. The network structure and the operation of the read and write heads can otherwise be similar to those known to one skilled in the art.

As another example of application, similarity measures can be computed using a simple PWM circuitry 335. The generation of read/write weights may require dot products and norms to be computed, i.e., to measure distances according to EQUATION 15:

$$d = \frac{kM}{\|k\|_1 + \|M\|_1} \qquad \text{EQUATION 15}$$

In EQUATION 15, k represents the input vector and M represents the memory. Such computations can potentially be performed using a single generation of PWM input signals. A fixed part, representing 1, is added to the PWM signal corresponding to the value of k to compute the norm $\|M\|1$. Two read accesses from the device are needed, where the first access corresponds to the norm $\|M\|$ 1 and the second access corresponds to a vector-matrix multiplication kM. One way to obtain the two results separately is to reset the integrators after $\|M\|$ 1 has been computed. In variants the integrators operate continuously and after the fixed part has been processed at the input, the current value is stored in an auxiliary memory. After the full input has been processed, the previously stored value needs to be subtracted from the total result to obtain $\|M\|$ 1 and kM.

Note, a time-to-spike scheme can be used for the input vector presentation at the rows/columns of the crossbar array, instead of using DACs or a PWM circuitry, which allows the energy required to transmit the input to be reduced. Also, in this case, the procedure to compute the similarity measure can potentially be implemented in a single crossbar operation. The pulses transmitted as reference points in the TTS scheme can be utilized for the L1 Norm Parallel Read (input vector contains all ones). The dot product parallel read can be implemented using the second pulse and the TTS integrator scheme. Instead of having a reference signal that activates the modulatory terms of the TTS integrators to their initial values, the currents are read during the reference signals to obtain the ‖M‖1. As a consequence, a single TTS read returns both the norm of M and the value of kM.

Figure 9:
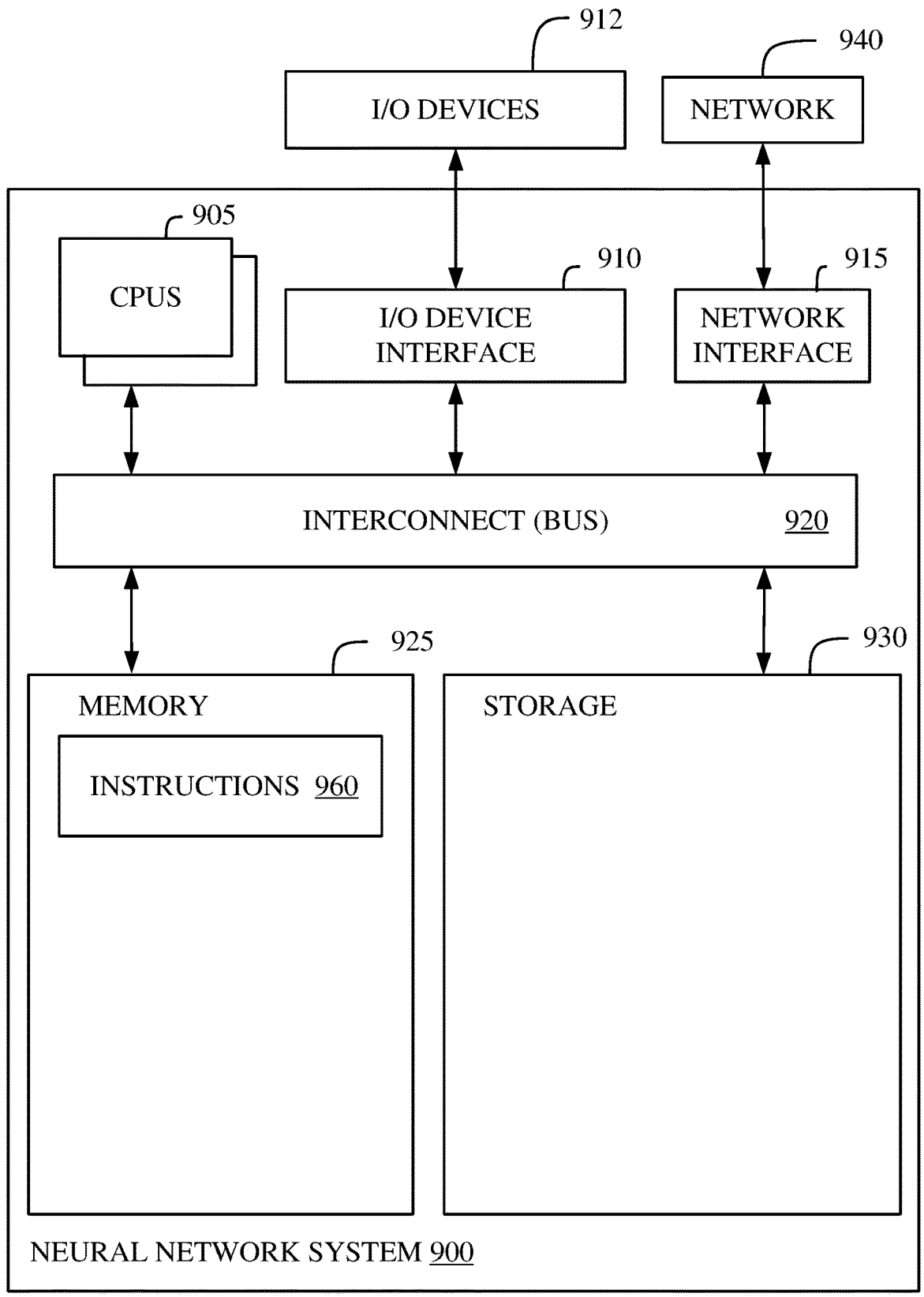
FIG. 9 is a block diagram of an example neural network system, in accordance with some embodiments of the present disclosure.

FIG. 9 is a block diagram of an example neural network system 900, in accordance with some embodiments of the present disclosure. In various embodiments, the neural network system 900 is similar to the neural network system 100 and can perform the methods described in FIGS. 2A and 5-8, and/or the functionality discussed in FIGS. 1 and 2B-2C, 3A-3C, and 4. In some embodiments, the neural network system 900 provides instructions for the aforementioned methods and/or functionalities to a client machine such that the client machine executes the method, or a portion of the method, based on the instructions provided by the neural network system 900. In some embodiments, the neural network system 900 includes software executing on hardware incorporated into multiple devices.

The neural network system 900 includes a memory 925, storage 930, an interconnect (e.g., BUS) 920, one or more CPUs 905 (also referred to as processors 905 herein), an I/O device interface 910, I/O devices 912, and a network interface 915.

Each CPU 905 retrieves and executes programming instructions stored in the memory 925 or the storage 930. The interconnect 920 is used to move data, such as programming instructions, between the CPUs 905, I/O device interface 910, storage 930, network interface 915, and memory 925. The interconnect 920 can be implemented using one or more busses. The CPUs 905 can be a single CPU, multiple CPUs, or a single CPU having multiple processing cores in various embodiments. In some embodiments, a CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of random access memory (e.g., static random access memory (SRAM), dynamic random access memory (DRAM), or Flash). The storage 930 is generally included to be representative of non-volatile memory, such as a hard disk drive, solid-state device (SSD), removable memory cards, optical storage, and/or flash memory devices. Additionally, the storage 930 can include storage area network (SAN) devices, the cloud, or other devices connected to the neural network system 900 via the I/O device interface 910 or to a network 950 via the network interface 915.

In some embodiments, the memory 925 stores instructions 960. However, in various embodiments, the instructions 960 are stored partially in memory 925 and partially in storage 930, or they are stored entirely in memory 925 or entirely in storage 930, or they are accessed over a network 950 via the network interface 915.

Instructions 960 can be processor-executable instructions for performing any portion of, or all, of the methods described in FIGS. 2A and 5-8, and/or the functionality discussed in FIGS. 1 and 2B-2C, 3A-3C, and 4.

In various embodiments, the I/O devices 912 include an interface capable of presenting information and receiving input. For example, I/O devices 912 can present information to a listener interacting with neural network system 900 and receive input from the listener.

The neural network system 900 is connected to the network 950 via the network interface 915. Network 950 can include a physical, wireless, cellular, or different network.

In some embodiments, the neural network system 900 can be a multi-user mainframe computer system, a single-user system, or a server computer or similar device that has little or no direct user interface but receives requests from other computer systems (clients). Further, in some embodiments, the neural network system 900 can be implemented as a desktop computer, portable computer, laptop or notebook computer, tablet computer, pocket computer, telephone, smartphone, network switches or routers, or any other appropriate type of electronic device.

It is noted that FIG. 9 is intended to depict the major representative components of an exemplary neural network system 900. In some embodiments, however, individual components can have greater or lesser complexity than as represented in FIG. 9, components other than or in addition to those shown in FIG. 9 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
providing a neural network system comprising a controller including a processing unit configured to execute a spiking neural network, and an interface connecting the controller to an external memory, the spiking neural network comprising spiking neuron apparatuses, wherein a spiking neuron apparatus of the spiking neuron apparatuses includes an accumulation block and an output generation block, the output generation block being configured to use an activation function for generating a current output value based on a current state variable computed by the accumulation block, the accumulation block being configured to compute the current state variable using a previous state variable and output of the apparatus;
executing the spiking neural network, the executing comprising generating read instructions and/or write instructions;
generating read weighting vectors according to the read instructions;
coupling read signals, representing the read weighting vectors, into output lines of the memory, thereby retrieving data from the memory;
generating write weighting vectors according to the write instructions;
coupling write signals, representing the write weighting vectors, into input lines of the memory, thereby writing data into the memory; and
during training of the spiking neural network, converting the retrieved data into a format of an output of the activation function by:
binarizing the retrieved data; and
applying a pseudo derivative to the read weighting vectors.

2. The method of claim 1, the activation function being a step function or a sigmoid function.

3. The method of claim 1, further comprising binarizing the retrieved data, wherein the binarizing includes computing values from the retrieved data as a Heaviside function of shifted values of said retrieved data.

4. The method of claim 1, wherein the external memory is configured to store binary values only.

5. A computer program product comprising program instructions stored on a computer readable storage medium, the program instructions executable by a processor to cause the processor to perform a method comprising:
executing a spiking neural network, the executing comprising generating read instructions and/or write instructions, the spiking neural network comprising spiking neuron apparatuses, wherein a spiking neuron apparatus of the spiking neuron apparatuses includes an accumulation block and an output generation block, the output generation block being configured to use an activation function for generating a current output value based on a current state variable computed by the accumulation block, the accumulation block being configured to compute the current state variable using a previous state variable and output of the apparatus;

generating read weighting vectors according to the read instructions;

coupling read signals, representing the read weighting vectors, into output lines of a memory, thereby retrieving data from the memory;

generating write weighting vectors according to the write instructions;

coupling write signals, representing the write weighting vectors, into input lines of the memory, thereby writing data into the memory; and during training of the spiking neural network, converting the retrieved data into a format of an output of the activation function by:
 binarizing the retrieved data; and
 applying a pseudo derivative to the read weighting vectors.

6. The computer program product of claim 5, the activation function being a step function or a sigmoid function.

7. The computer program product of claim 5, the method further comprising binarizing the retrieved data, wherein the binarizing includes computing values from the retrieved data as a Heaviside function of shifted values of said retrieved data.

8. A neural network system comprising:
 a controller including a processing unit configured to execute a spiking neural network, the spiking neural network comprising spiking neuron apparatuses, wherein a spiking neuron apparatus of the spiking neuron apparatuses includes an accumulation block and an output generation block, the output generation block being configured to use an activation function for generating a current output value based on a current state variable computed by the accumulation block, the accumulation block being configured to compute the current state variable using a previous state variable and output of the apparatus; and
 an interface connecting the controller to an external memory, wherein the interface is configured to convert the retrieved data into a format of an output of the activation function, and the controller being configured for:
  executing the spiking neural network, the executing comprising generating read instructions and/or write instructions;
 the interface being configured for:
  generating read weighting vectors according to the read instructions,
  coupling read signals, representing the read weighting vectors, into output lines of the memory, thereby retrieving data from the memory;
  generating write weighting vectors according to the write instructions,
  coupling write signals, representing the write weighting vectors, into input lines of the memory, thereby writing data into the memory; and
  during training of the spiking neural network, converting the retrieved data into a format of an output of the activation function by:
   binarizing the retrieved data; and
   applying a pseudo derivative to the read weighting vectors.

9. The neural network system of claim 8, the activation function being a step function or a sigmoid function.

10. The neural network system of claim 8, the interface being configured to binarize the retrieved data.

11. The neural network system of claim 10, wherein binarizing the retrieved data comprises computing values from the retrieved data as a Heaviside function of shifted values of the retrieved data.

12. The neural network system of claim 8, further comprising the memory, the memory comprising a neuromorphic memory device with a crossbar array structure that includes the input lines of the memory and the output lines of the memory interconnected at junctions via electronic devices.

13. The neural network system of claim 12, the crossbar array structure includes N of the input lines and W of the output lines, where N of the input lines >1 and W of the output lines >1, whereby a memory capacity of the neuromorphic memory device is determined by a memory matrix M of dimension N×W.

14. The neural network system of claim 13, wherein the crossbar array structure includes a single electronic device per junction, wherein the electronic device is a memristive device.

15. The neural network system of claim 13, wherein the crossbar array structure further includes multiple pulse width modulation circuits, whereby both read heads and write heads of the interface are connected to said input lines via a respective one of the multiple pulse width modulation circuits.

16. The neural network system of claim 13, wherein the crossbar array structure further includes time to spike (TTS) integrators, whereby both read heads and write heads of the interface are connected to said input lines via a respective one of the TTS integrators.

17. The neural network system of claim 8, wherein said interface includes read heads connected to the input lines and the output lines of the memory, and write heads connected to the input lines.

* * * * *